(12) United States Patent  (10) Patent No.: US 8,175,527 B2
Hebiguchi et al.  (45) Date of Patent: May 8, 2012

(54) PORTABLE APPARATUS

(75) Inventors: Hiroyuki Hebiguchi, Miyagi-ken (JP);
Shigetoshi Matsuta, Miyagi-ken (JP);
Nobuaki Haga, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 77 days.

(21) Appl. No.: 12/818,479

(22) Filed: Jun. 18, 2010

(65) Prior Publication Data

US 2010/0255786 A1  Oct. 7, 2010

Related U.S. Application Data

(63) Continuation of application No. PCT/JP2008/071892, filed on Dec. 2, 2008.

(30) Foreign Application Priority Data

Dec. 26, 2007 (JP) ................................ 2007-334667

(51) Int. Cl.
*H04B 5/00* (2006.01)

(52) U.S. Cl. ........ 455/41.1; 455/41.2; 455/95; 455/100; 455/575.1; 455/575.6; 340/13.24; 340/13.26; 340/539.1; 340/539.11; 340/539.22

(58) Field of Classification Search .............. 455/41.1, 455/41.2, 95, 100, 575.1, 575.6, 575.7; 340/5.8, 340/5.82, 5.51, 5.52, 572.1, 572.5, 572.6, 340/573.1, 13.24, 13.26, 539.1, 539.11, 539.22
See application file for complete search history.

(56) References Cited

U.S. PATENT DOCUMENTS

| 5,914,701 | A | 6/1999 | Gersheneld et al. |
| 6,223,018 | B1 * | 4/2001 | Fukumoto et al. ........... 455/41.1 |
| 6,864,780 | B2 * | 3/2005 | Doi et al. ..................... 340/5.64 |
| 7,069,062 | B2 * | 6/2006 | Minotani et al. ........... 455/575.6 |
| 7,480,492 | B2 * | 1/2009 | Williams et al. .............. 455/100 |
| 7,583,930 | B2 * | 9/2009 | Minotani et al. ............. 455/41.1 |
| 7,668,122 | B2 * | 2/2010 | Sung et al. .................... 370/280 |
| 7,684,769 | B2 * | 3/2010 | Song et al. .................... 455/100 |
| 7,801,483 | B2 * | 9/2010 | Minotani et al. ............. 455/41.1 |
| 7,834,853 | B2 | 11/2010 | Finney et al. |
| 2002/0049070 | A1 | 4/2002 | Bick |

(Continued)

FOREIGN PATENT DOCUMENTS

JP  11-509380  8/1999

(Continued)

OTHER PUBLICATIONS

Search Report dated Jan. 27, 2009 from International Application No. PCT/JP2008/071892.

(Continued)

*Primary Examiner* — Tuan A Tran
(74) *Attorney, Agent, or Firm* — Beyer Law Group LLP

(57) ABSTRACT

A portable apparatus of the present invention functions as a transmitter and/or a receiver in electric field communication in which communication is performed through a human body by converting an information signal into an electric field signal; is substantially hexahedron-shaped and provided with sides and an display surface allowing information to be viewed; and includes an outer electrode for electric field communication provided on the display surface and a human-body-side electrode for electric field communication provided on at least one of the sides.

11 Claims, 8 Drawing Sheets

U.S. PATENT DOCUMENTS

2009/0149212 A1  6/2009  Kano
2010/0184373 A1  7/2010  Hebiguchi et al.

FOREIGN PATENT DOCUMENTS

| | | |
|---|---|---|
| JP | 2001-308803 | 11/2001 |
| JP | 2005-217962 | 8/2005 |
| JP | 2005-303921 | 10/2005 |
| JP | 2005-303922 | 10/2005 |
| JP | 2005-341312 | * 12/2005 |
| JP | 2005-341412 | 12/2005 |
| JP | 2006-352318 | 12/2006 |
| WO | 96/36134 | 11/1996 |

OTHER PUBLICATIONS

Search Report dated Nov. 4, 2008 for International Application No. PCT/JP2008/068433.

Office Action dated Oct. 28, 2011 from U.S. Appl. No. 12/750,614.

* cited by examiner

PORTABLE APPARATUS

CLAIM OF PRIORITY

This application is a Continuation of International Application No. PCT/JP2008/071892 filed on Dec. 2, 2008, which claims benefit of the Japanese Patent Application No. 2007-334667 filed on Dec. 26, 2007. The entire contents of each application noted above are hereby incorporated by reference.

BACKGROUND OF THE INVENTION

1. Field of the Invention

The present invention relates to a portable apparatus used for electric field communication in which information signals are transmitted and/or received via a transmission medium such as a human body or space.

2. Description of the Related Art

Regarding a communication system in which transmission/reception is performed via a transmission medium (mainly a human body), a method of communication using an electric field is disclosed in, for example, PCT Japanese Translation Patent Publication No. 11-509380. Referring to FIG. 11, a transmitter and a receiver disclosed in PCT Japanese Translation Patent Publication No. 11-509380 each include an electrode pair, i.e., a pair of a human body side (inner) electrode 111 having close capacitive coupling with a human body 112 and an outer electrode 113 that is arranged in such a manner as to have stronger coupling with the room ground than the human body side (inner) electrode 111. The pair of electrodes are plate-shaped and arranged to be parallel to each other, as illustrated in FIG. 11.

When the above technology is applied to portable apparatuses, it is important to design the electrodes appropriately, and it is necessary to devise transmission/reception electrodes, i.e., transmission-medium-side electrodes. In view of deterioration in communication quality caused when unnecessary electromagnetic waves, generated from electronic circuits or a display of a portable terminal for electric field communication, penetrate into a transmission medium such as a human body, Japanese Unexamined Patent Application Publication No. 2005-303922 discloses that transmission/reception electrodes for electric field communication are newly provided at positions away from the circuit components (such as a display, operation keys, an electric field communication transceiver, and a computer) of a portable terminal for electric field communication, thereby suppressing penetration of unnecessary electromagnetic waves generated from the circuit components into a transmission medium, and improving communication quality.

SUMMARY OF THE INVENTION

A generally often used parallel plate arrangement of electrodes is effective for the case in which an apparatus is fixed to a human body using a band, similarly to a wrist watch. However, when a portable apparatus having such an electrode arrangement is used while being held by hand, the hand that holds the apparatus may short-circuit the outer electrode and the transmission-medium-side electrode, thereby causing communication to be disabled, or even when the apparatus is held with the outer electrode oriented upward and the transmission-medium-side electrode facing a palm, a space may exist between the transmission-medium-side electrode and the palm, thereby causing an insufficient degree of capacitive coupling and resultant unsatisfactory communication performance. Furthermore, since the method of newly providing transmission/reception electrodes for electric field communication requires a structure in which the transmission/reception electrodes considerably extend from the portable apparatus when in use for communication, the transmission/reception electrodes are configured so as to be stowed away when not in use by newly adding a mechanism for allowing rotation or sliding. However, this will increase the thickness of the apparatus, influence the design, and increase the cost and weight of the apparatus.

In view of this point, the present invention provides a portable apparatus that allows the communication quality while the apparatus is being held to be increased without changing the original design of the portable apparatus. In addition, the present invention realizes an easy-to-use portable apparatus which allows communication to be performed irrespective of whether the apparatus is used while being held or stored in a pocket, for example.

A portable apparatus of the present invention functions as a receiver and/or a transmitter in electric field communication in which communication is performed through a transmission medium by converting an information signal into an electric field signal; is substantially hexahedron-shaped and provided with sides and an display surface allowing information to be viewed; includes an outer electrode for electric field communication provided on the display surface; and at least one of the sides is provided with a first transmission-medium-side electrode for electric field communication.

According to this configuration, since a user holds the portable apparatus in the transmission medium (hand) so as to be able to view the display device, the outer electrode provided on the display surface is unlikely to be shielded by the transmission medium that is holding the portable apparatus, and reliable coupling between the outer electrode and the external room ground or the outer electrode of the apparatus of the communication counterpart is realized. In addition, the transmission-medium-side electrode is reliably in close contact with the transmission medium that is holding the portable apparatus, and reliable coupling between the transmission medium and the transmission-medium-side electrode is realized. Thereby, communication performance while the portable apparatus is being held in the transmission medium is increased.

In the portable apparatus of the present invention, it is preferable that a second transmission-medium-side electrode for electric field communication be provided on an opposite surface opposite the display surface, and switching control be performed such that the second transmission-medium-side electrode provided on the opposite surface is made to be a transmission-medium-side electrode for electric field communication when the portable apparatus has not been operated for a predetermined period of time, and the first transmission-medium-side electrode provided on the side is made to be the transmission-medium-side electrode for electric field communication when the portable apparatus has been operated. According to this configuration, when the portable apparatus is used while being held, the transmission-medium-side electrode provided on the side has reliable capacitive coupling with the transmission medium, and when the portable apparatus is, for example, put in a pocket, the transmission-medium-side electrode provided on the bottom surface has reliable capacitive coupling with the transmission medium. Hence, reliable communication is realized both when the portable apparatus is held by hand and when the portable apparatus is put in a pocket.

In the portable apparatus of the present invention, it is preferable that the portable apparatus further include a detection unit for detecting that the portable apparatus is being held; a second transmission-medium-side electrode for electric field communication be provided on an opposite surface opposite the display surface; and switching control be performed such that the second transmission-medium-side electrode provided on the opposite surface is made to be the transmission-medium-side electrode for electric field communication when it has not been detected that the portable apparatus is being held, and the first transmission-medium-side electrode provided on the side is made to be the transmission-medium-side electrode for electric field communication when it has been detected that the portable apparatus is being held. According to this configuration, since it is more reliably determined that the portable apparatus is being held by the transmission medium, switching of the transmission-medium-side electrodes is more reliably performed and a more reliable increase in communication performance is realized.

In the portable apparatus of the present invention it is preferable that, when an input function is provided and an input to the portable apparatus and the electric field communication are performed at the same time, switching control be performed such that some of the first transmission-medium-side electrodes provided on the sides are made to be transmission-medium-side electrodes for electric field communication, and the rest of the first transmission-medium-side electrodes provided on the sides are made to be outer electrodes for the electric field communication.

Since the portable apparatus of the present invention functions as a receiver and/or a transmitter in electric field communication in which communication is performed through a transmission medium by converting an information signal into an electric field signal; is substantially hexahedron-shaped and provided with sides and an display surface allowing information to be viewed; includes an outer electrode provided on the display surface; and at least one of the sides is provided with a first transmission-medium-side electrode, the communication quality while the apparatus is being held can be enhanced without changing the original design.

DESCRIPTION OF THE PREFERRED EMBODIMENTS

Figure 11:
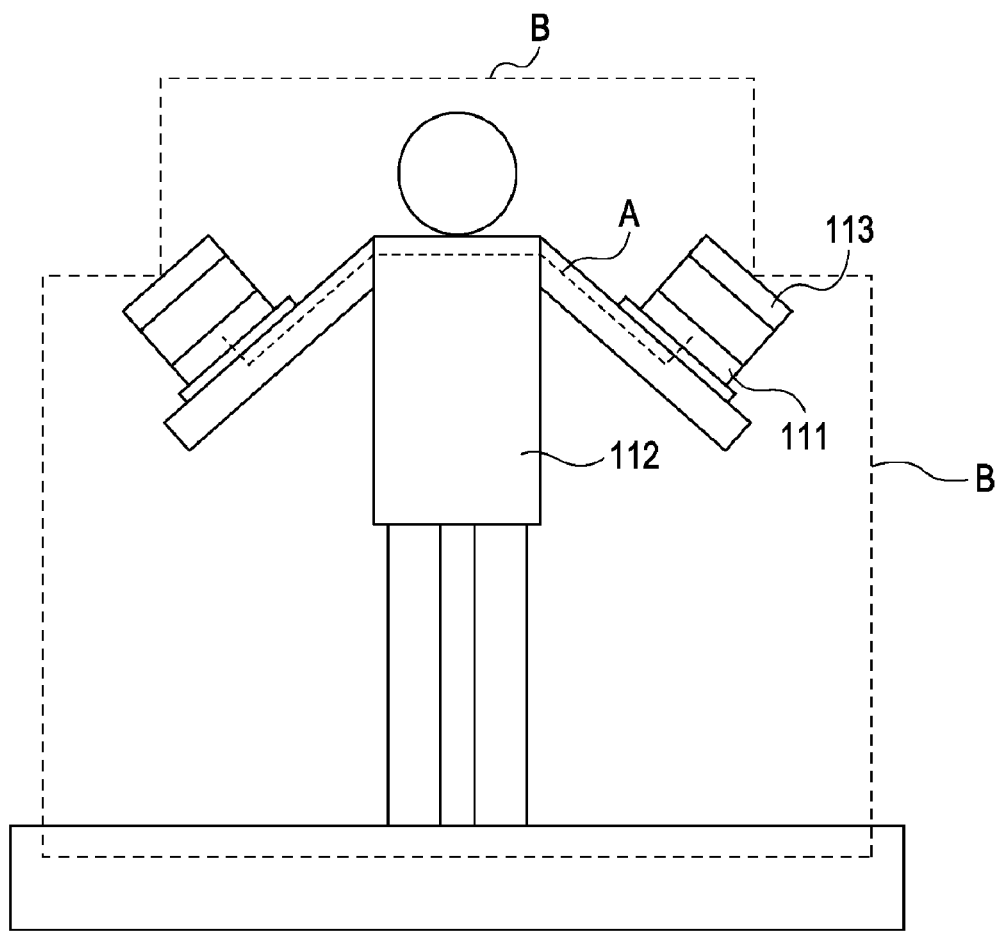
FIG. 11 is an illustration for explaining electric field communication.

Human body communication using an electric field requires a forward path (path A in FIG. 11) through which a signal flows via capacitive coupling among a transmitter, a human body, and a receiver, and a backward path (path B in FIG. 11) through which a signal flows via capacitive coupling among the receiver, a dielectric such as air or a conductor such as the ground, and the transmitter. In this case, in order to efficiently transmit an electric field signal it is preferable to make human-body-side electrodes (transmitter electrode, receiver electrode) 111 forming the forward path (path A) have a large degree of capacitive coupling with a human body 112, and to make the degree of capacitive coupling between the transmission electrode and reception electrode via the human body 112 large. On the other hand, it is preferable to make outer electrodes (transmitter outer electrode, receiver outer electrode) 113 forming the backward path (path B) have a small degree of capacitive coupling with the human body 112 and to make the degree of capacitive coupling between the outer electrode of the transmitter and the outer electrode of the receiver large. Further, to decrease the loss of the electric field signal and to increase transmission efficiency, it is preferable to make the degree of capacitive coupling between the human-body-side electrode 111 and the outer electrode 113 small.

In view of the above points, the inventors have found that communication quality while a portable apparatus is being held can be enhanced without changing the original design of the portable apparatus by determining the positions of the outer electrode and transmission-medium-side electrode for electric field communication in accordance with a manner in which the portable apparatus is used. This has lead to the present invention.

That is, in summary, the portable apparatus of the present invention functions as a receiver and/or a transmitter in electric field communication in which communication is performed through a transmission medium by converting an information signal into an electric field signal; is substantially hexahedron-shaped and provided with sides and an display surface allowing information to be viewed; includes an outer electrode provided on the display surface; and at least one of the sides is provided with a first transmission-medium-side electrode. Hence, the communication quality while the apparatus is being held can be enhanced without changing the original design.

Hereinafter, embodiments of the present invention are described in detail with reference to the attached drawings.

First Embodiment

Figure 1:
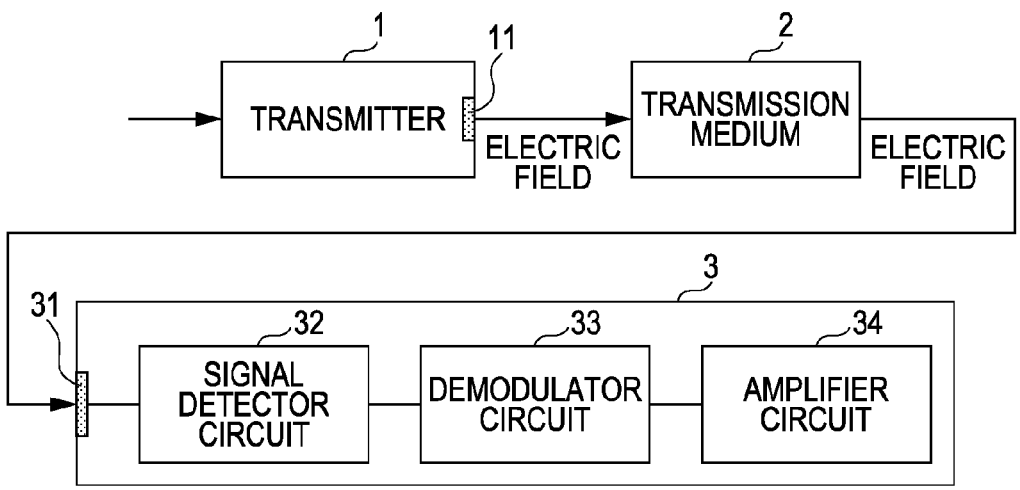
FIG. 1 is a schematic configuration diagram of an electric field communication system provided with a portable apparatus according to an embodiment of the present invention.

FIG. 1 is a schematic configuration diagram of an electric field communication system using a portable apparatus according to the present embodiment of the invention. The electric field communication system illustrated in FIG. 1 mainly includes a transmitter 1 by which an information signal is modulated, converted into an electric field signal, and transmitted via a transmitter electrode 11, a transmission medium 2 such as a human body or space that transmits the information signal through the electric field signal, and a receiver 3 that detects the electrical field signal through the transmission medium 2 and demodulates the electric field signal into an information signal. Here, the transmission medium 2 is assumed to be a human body, and the receiver 3 is a portable apparatus.

The portable apparatus 3 includes a transmission medium electrode (human-body-side electrode) 31 that receives an electric field signal from the transmission medium 2, a signal detector circuit 32 that obtains an information signal from the electric field received by the human-body-side electrode 31, a demodulator circuit 33 that demodulates the signal detected by the signal detector circuit 32 into an information signal, and an amplifier circuit 34 that amplifies the information signal after demodulation.

Figure 2:
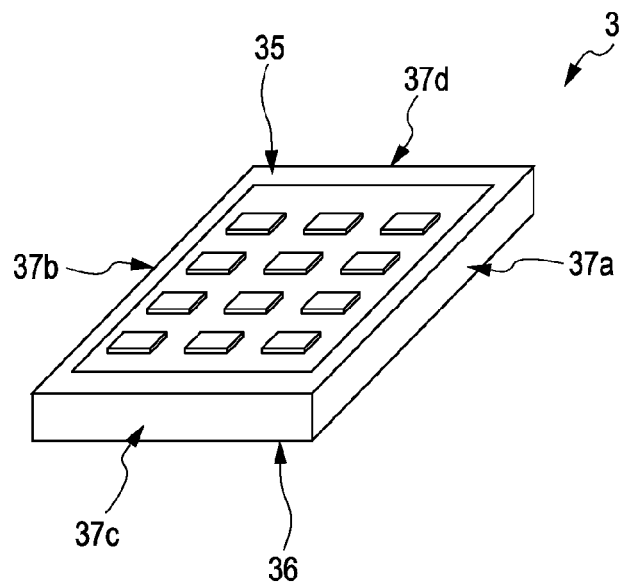
FIG. 2 is a schematic configuration diagram of a portable apparatus according to an embodiment of the present invention.

FIG. 2 is a schematic configuration diagram of the portable apparatus illustrated in FIG. 1. The portable apparatus 3 illustrated in FIG. 2 is substantially hexahedron-shaped, and has a top surface 35 and a bottom surface 36 opposite each other, and four sides 37a to 37d. Here, the top surface 35 is a display surface that allows information to be viewed. The sides 37a and 37b are opposite each other, and the sides 37c and 37d are opposite each other. Here, to make the explanation easier hereinafter, it is assumed that the side 37a faces east, the side 37b faces west, the side 37c faces south, and the side 37d faces north. In the portable apparatus 3, an outer electrode for electric field communication is provided on the top surface 35, which is the display surface, and the human-body-side electrodes are provided on at least one of the sides 37a to 37d (here, on all the sides) and along the edges between the sides 37 and the bottom surface 36. Note that in a portable apparatus having multiple display surfaces, the outer electrode is provided on a display surface that has, for example, a display device displaying the largest amount of information.

Figure 3:
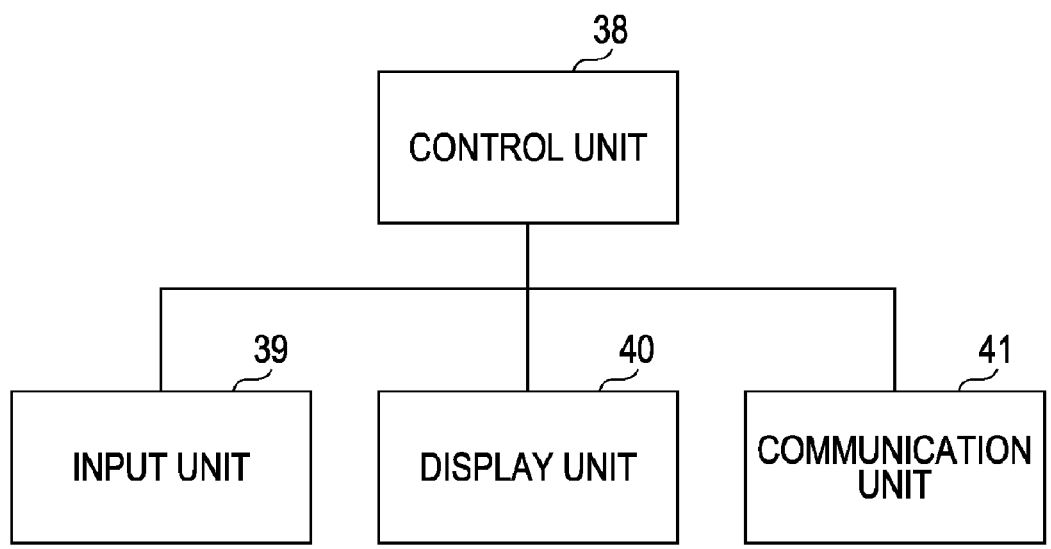
FIG. 3 is a block diagram of the internal configuration of a portable apparatus according to an embodiment of the present invention.

FIG. 3 is a block diagram illustrating the internal configuration of the portable apparatus 3 according to the first embodiment. The portable apparatus 3 mainly includes a control unit 38 that performs overall control of the apparatus, an input unit 39 that receives information, a display unit 40 that displays information, and a communication unit 41 that communicates with other communication apparatuses. Note that the control unit 38 includes a measurement unit, such as a timer for measuring time.

In PCT Japanese Translation Patent Publication No. 11-509380 described above, a human-body-side electrode and an outer electrode are arranged parallel to each other. However, if such an electrode arrangement is applied to a portable apparatus, when the portable apparatus is held by hand, the human-body-side electrode and the outer electrode may be short-circuited as a result of being held by a hand, thereby causing communication to be disabled, or even when the apparatus is held with the outer electrode oriented upward, a space may exist between the human-body-side electrode and the palm, thereby causing an insufficient level of communication.

In the portable apparatus according to the present embodiment, an outer electrode for electric field communication is provided on the top surface 35, which is a display surface, and human-body-side electrodes for electric field communication are provided on the sides 37a to 37d. In other words, as illustrated in FIG. 4A, when the portable apparatus 3 is held in the palm 2a of a human hand 2, an outer electrode 42 is arranged on the top surface of the portable apparatus 3, and human-body-side electrodes 43 are arranged on the sides of the portable apparatus 3.

Figure 4A:
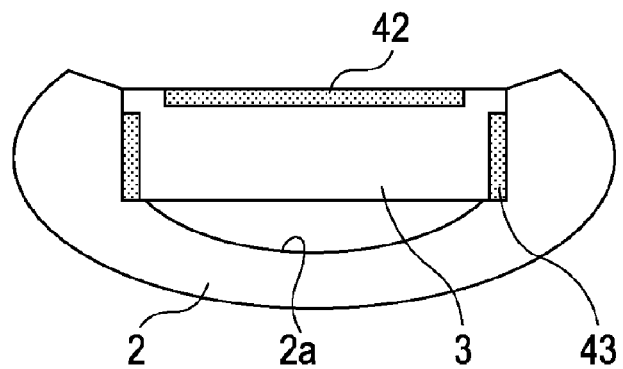
FIGS. 4A to 4D are illustrations for explaining a portable apparatus according to a first embodiment of the present invention.

When a user uses the portable apparatus 3 while holding it in the hand 2, the user holds the portable apparatus 3 in a manner as illustrated in FIG. 4A so that the user can easily view the display device. Hence, it is unlikely that the hand 2 touches the outer electrode 42 provided on the top surface 35 of the hexahedron, and the human-body-side electrodes 43 are reliably in close contact with the hand 2 that is holding the portable apparatus 3. Thereby, the degree of capacitive coupling between the human-body-side electrodes 43 and the hand 2 is increased, and the degree of capacitive coupling between the outer electrode 42 and the hand 2 is decreased. Consequently, reliable human body communication is realized.

Figure 4B:
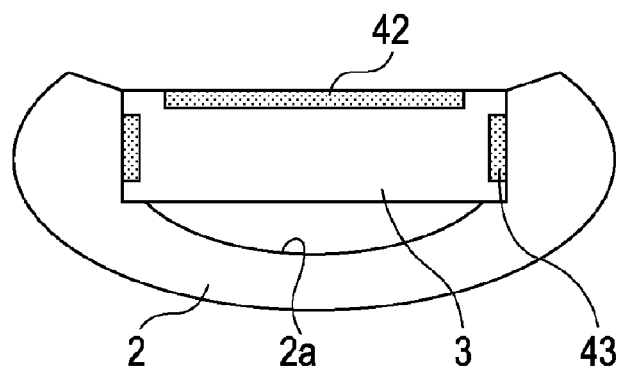
Figure 4C:
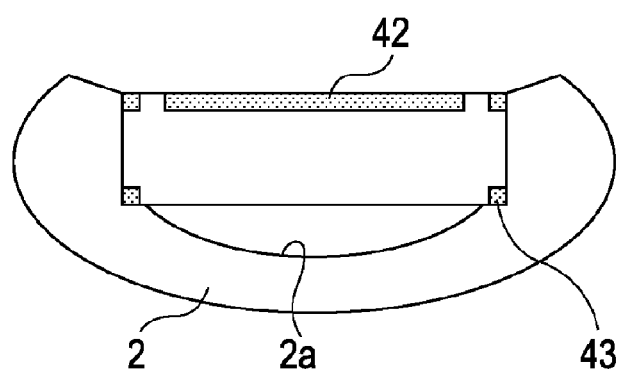
Figure 4D:
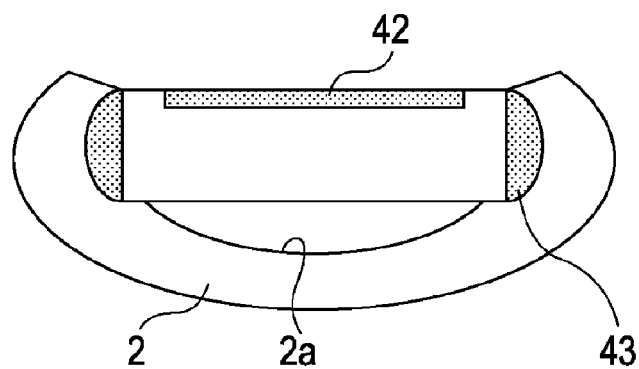

Requirement for the positional relationship between the outer electrode 42 and the human-body-side electrodes 43 in the portable apparatus 3 is that the degree of capacitive coupling between the human-body-side electrodes 43 and the hand 2 is large and the degree of capacitive coupling between the outer electrode 42 and the hand 2 is small. For example, the human-body-side electrode(s) 43 may be provided on at least one of the sides 37a to 37d, as illustrated in FIG. 4B, or may be provided along the edge(s) between the top surface 35 and at least one of the sides 37a to 37d, and along the edge(s) between the bottom surface 36 and at least one of the sides 37a to 37d, as illustrated in FIG. 4C. The human-body-side electrodes 43 may preferably be provided not only on the sides but also along the edges so as to be reliably in close contact with the hand 2. Referring to FIG. 4D, by making the sides curved outwards so as to form convex surfaces, the human-body-side electrodes 43 may be provided on the curved sides. The configuration illustrated in FIG. 4D allows the human-body-side electrodes 43 to be in closer contact with the hand 2.

Although the hexahedron of the portable apparatus 3 has four sides, it is only necessary that at least one of the sides be provided with the human-body-side electrode 43. For example, in the portable apparatus 3 illustrated in FIG. 2, since the length in the north-south direction is relatively longer, a user usually contacts the sides 37a and 37b in the east-west direction when holding the portable apparatus 3. Hence, it is preferable that at least one of the sides 37a and 37b in the east-west direction have the human-body-side electrode 43 provided thereon.

The operation of communication in the electric field communication system having the above-described configuration will now be described. First, in the transmitter 1, an information signal is modulated using a carrier wave having frequencies (several hundred kilohertz to several tens of megahertz) for which a human body is conductive, and a modulated signal is obtained. The modulated signal, after amplification, is converted into a voltage that varies, and thereby into an electric field signal corresponding to the modulated signal. This electric field signal is provided to a human body which is the transmission medium 2. Note that there is no specific restriction on the modulation method in the transmitter 1.

The electric field signal given to a human body is received by the human-body-side electrode 31 of the portable apparatus 3. The electric field signal received by the human-body-side electrode 31 is transmitted to the signal detector circuit 32. In the signal detector circuit 32, the electric field signal is amplified by an internal amplifier and transmitted to the demodulator circuit 33, where the signal is demodulated using the carrier wave used in the transmitter 1, and an information signal is obtained. This information signal is amplified by the amplifier circuit 34 and output.

In the electric field communication system having the above-described configuration an outer electrode for electric field communication is provided on the top surface 35, which is the display surface, and human-body-side electrodes are provided on the sides 37a to 37d. Since a user holds the portable apparatus 3 by the hand 2 so as to be able to view the display device, the outer electrode 42 provided on the display surface is unlikely to be shielded by the hand 2 that is holding the portable apparatus 3, and reliable coupling between the outer electrode 42 and the external room ground or the outer electrode 42 of the apparatus of the communication counterpart is realized. In addition, the human-body-side electrodes 43 are reliably in close contact with the hand 2 that is holding the portable apparatus 3, and reliable coupling between the hand 2 and the human-body-side electrodes 43 is realized. Thereby, communication performance while the portable apparatus 3 is being held by hand is increased.

Second Embodiment

Figure 5A:
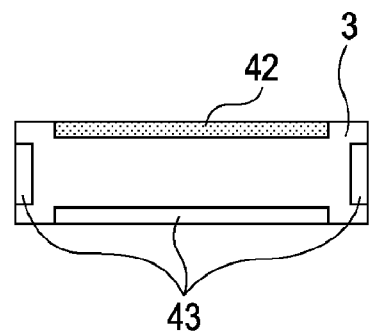
FIGS. 5A to 5c are illustrations for explaining portable apparatuses according to second and third embodiments of the present invention.

In the present embodiment, description is made of a case in which a transmission-medium-side electrode is further provided on the bottom surface 36 opposite the top surface 35, and switching control is performed such that the transmission-medium-side electrode provided on the bottom surface 36 is made to be a transmission-medium-side electrode for electric field communication when a portable apparatus 3 has not been operated for a predetermined period of time, and the transmission-medium-side electrode on the sides 37 is made to be a transmission-medium-side electrode for electric field communication when the portable apparatus 3 has been operated. In other words, referring to FIG. 5A, in the present embodiment, similarly to the first embodiment, the top surface 35 is a display surface, an outer electrode 42 for human body communication is provided on the top surface 35, human-body-side electrodes 43 may be provided on the sides 37 and the bottom surface 36, and switching may be performed among the human-body-side electrodes 43 and the outer electrode 42 in accordance with a usage pattern.

Figure 5B:
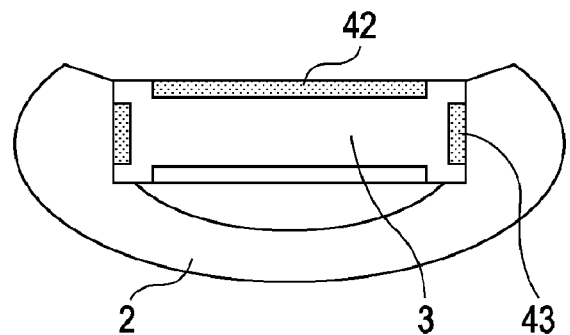

Referring to FIG. 5B, when the portable apparatus 3 has been operated, it is assumed that the portable apparatus 3 is being held by the hand 2, and the sides are made to be the human-body-side electrodes 43. Thereby, when the portable apparatus 3 is being held by the hand 2, stable human body communication is realized since the human-body-side electrodes 43 on the sides are likely to be in close contact with the hand 2, similarly to the first embodiment. Here, examples of operations for the portable apparatus 3 include operations through various switches, a keyboard, a touch panel, a fingerprint sensor, and voice input.

Figure 5C:
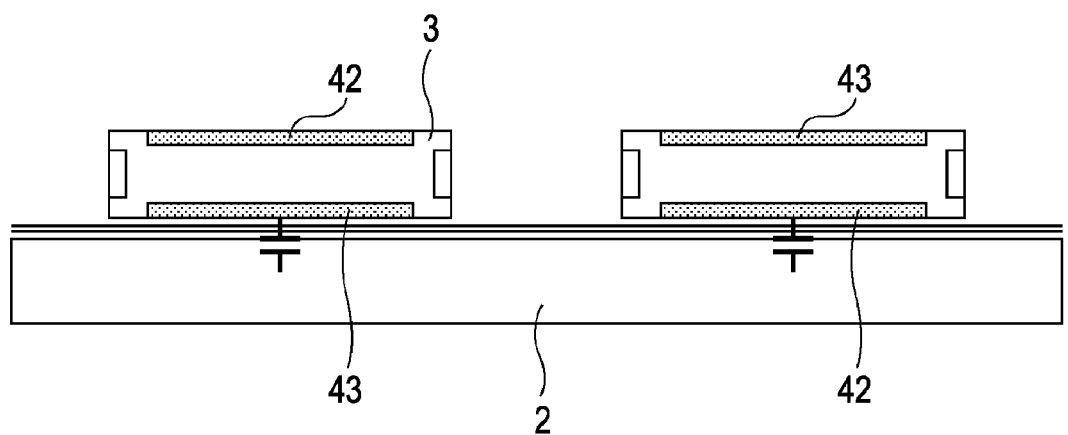

On the other hand, when the portable apparatus 3 has not been operated for a predetermined period of time, it is assumed that the portable apparatus 3 is, for example, in a pocket, and the bottom surface is made to be the human-body-side electrode 43, as illustrated in FIG. 5C. Fundamentally, communication is possible when one of the outer electrode 42 and the human-body-side electrode 43 faces a human body and the other faces outward. Hence, when the portable apparatus 3 has not been operated, by arranging the outer electrode 42 and the human-body-side electrode 43 respectively on the top surface and the bottom surface, one of the surface faces a human body and the other surface faces outward. Consequently, electric field communication is possible. In general, the display device is relatively large in the portable apparatus 3, and hence, the top surface of the hexahedron on which the display device is provided is likely to be the largest surface of the hexahedron. Hence, when the portable apparatus 3 is put in a pocket, for example, it is considered that the top surface or the bottom surface is in parallel with the human body 2 in the pocket. Consequently one of the surfaces faces the human body and the other faces outward, even if a user is not conscious of it, enabling human body communication.

In the state illustrated in FIG. 5C, since it is not known whether the display surface or the bottom surface faces the human body, it is preferable to make communication possible irrespective of which surface faces a human body. In other words, by designing the areas and thicknesses of the electrodes, the conductivity of a casing, and the like, such that the capacitance between the electrode and the human body has a substantially constant value irrespective of which electrode faces the human body in a state in which the portable apparatus is in a pocket, more stable communication performance is realized. For example, the electrode on the display surface and the electrode on the bottom surface are made to have approximately the same area.

Figure 6:
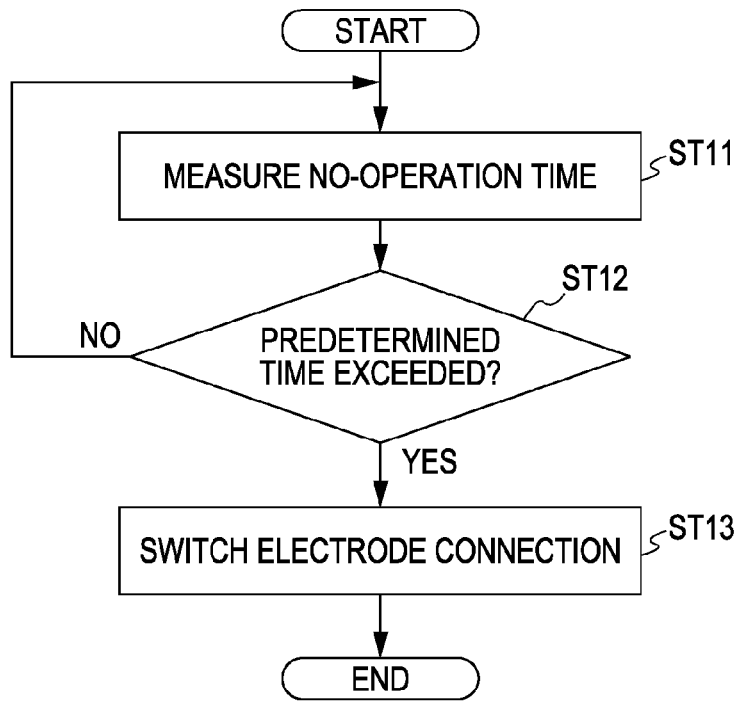
FIG. 6 is a flowchart for explaining the operation of the portable apparatus according to the second embodiment.

In the present embodiment, when the portable apparatus 3 has not been operated for a predetermined period of time, selective switching among the human-body-side electrodes 43 and the outer electrode 42 is performed using a timer in the control unit 38 of the configuration illustrated in FIG. 3, in accordance with the process illustrated in FIG. 6, when required. First, referring to FIG. 5B, in a default state, the electrodes are connected such that the outer electrode 42 is arranged on the top surface and the human-body-side electrodes 43 are arranged on the sides. In this state, a no-operation time is measured using the timer. In other words, a time during which the portable apparatus 3 is not operated is measured (ST11). Then it is determined whether or not the measured time has exceeded a predetermined time (ST12), and when the predetermined time has been exceeded, the electrode connection is switched such that the outer electrode 42 and the human-body-side electrode 43 are arranged respectively on the top surface and the bottom surface, as illustrate in FIG. 5C (ST13).

This control allows reliable electric field communication to be realized similarly to the first embodiment even for different states of usage (portable apparatus has been operated or not). In addition, since electrodes are provided on the top surface and bottom surface, which have the largest areas in a hexahedron, the electrodes can be made to have large areas. Thereby, capacitance between the electrode and a human body is increased, resulting in an advantage of enhanced communication sensitivity.

Note that when the electrodes are arranged parallel to each other as illustrated in FIG. 5C, parasitic capacitance between the electrodes increases, and it may be considered that the signal loss due to the parasitic capacitance cannot be ignored. However, in such a case, by inserting an inductor in parallel with the parasitic capacitance and causing LC resonance to be generated at a frequency used for the electric field communication, the loss of the signal is suppressed.

Third Embodiment

In the present embodiment, description is made of a case in which a detection unit is provided that detects that the portable apparatus 3 has been held, a transmission-medium-side electrode is further provided on the bottom surface 36 opposite the top surface 35, and switching control is performed such that the transmission-medium-side electrode provided on the bottom surface 36 is made to be a transmission-medium-side electrode for electric field communication when it has not been detected that the portable apparatus 3 is being held, and the transmission-medium-side electrode on the sides 37 is made to be a transmission-medium-side electrode for electric field communication when it has been detected that the portable apparatus 3 is being held. In other words, referring to FIG. 5A, also in the present embodiment, similarly to the first embodiment, the top surface 35 is a display surface, an outer electrode 42 for human body communication is provided on the top surface 35, human-body-side electrodes 43 may be provided on the sides 37 and the bottom surface 36, and switching may be performed among the human-body-side electrodes 43 and the outer electrode 42 in accordance with a usage pattern.

In the second embodiment, description has been made of the case in which it is indirectly determined whether or not the portable apparatus 3 is being held on the basis of whether or not the portable apparatus 3 has been operated. However, in the present embodiment, means for directly detecting whether or not the portable apparatus 3 is being held by the hand 2 is provided, thereby making it possible to switch between the human-body-side electrodes more accurately. In other words, the portable apparatus 3 according to the present embodiment mainly includes a control unit 38 that performs overall control of the apparatus, an input unit 39 that receives information, a display unit 40 that displays information, a communication unit 41 that communicates with other communication apparatuses, and a detection unit 44 that detects whether or not the portable apparatus 3 is being held by the hand 2. Note that when the portable apparatus 3 is being held by the hand 2, it is in a state of being operated, and when the portable apparatus 3 is not being held by the hand 2, it is not being operated. Hence, this detection is equivalent to detection of a user operation.

Examples of the detection methods include a method in which it is detected using an infrared sensor whether or not a living body is in contact therewith and a method in which, by providing electrodes on all the sides (east, west, north, and south) of the hexahedron, it is detected which electrode is in contact with a hand from a change (drop) in resistance or capacitance among the electrodes. Specifically, the method of detecting resistance allows reliable communication by making an electrode whose resistance has dropped be the human-body-side electrode.

Figure 7:
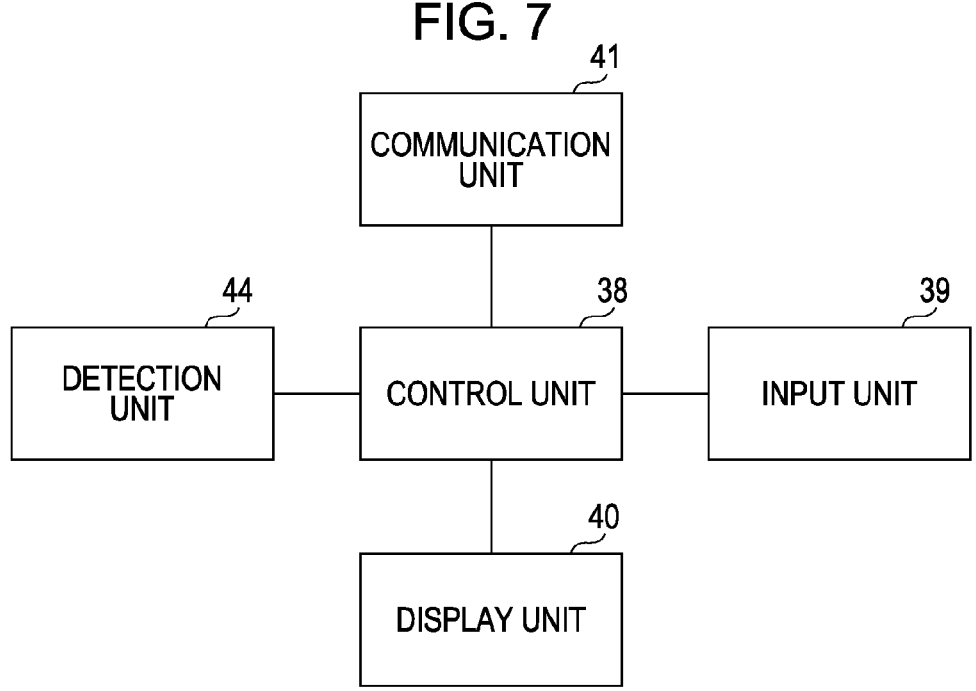
FIG. 7 is a block diagram of the internal configuration of the portable apparatus according to the third embodiment.
Figure 8:
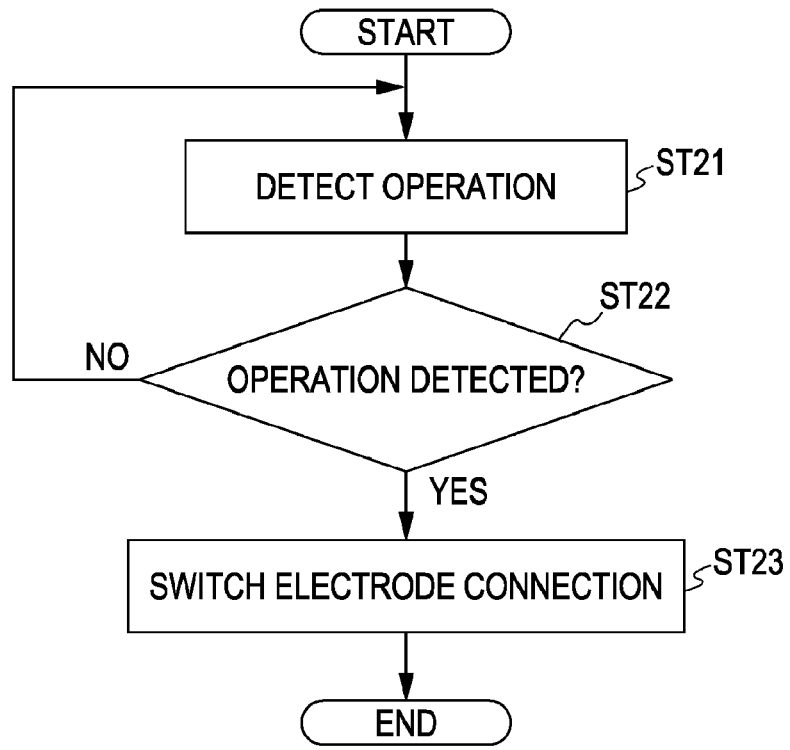
FIG. 8 is a flowchart for explaining the operation of the portable apparatus according to the third embodiment.

In the present embodiment, when the user operation has been detected, selective switching among the human-body-side electrodes 43 and the outer electrode 42 is performed using the control unit 38 and the detection unit 44 of the configuration illustrated in FIG. 7, in accordance with the process illustrated in FIG. 8, when required. First, in a default state, the electrodes are connected such that the outer electrode 42 and the human-body-side electrode 43 are arranged respectively on the top surface and the bottom surface, as illustrated in FIG. 5C. In this state, an operation for the portable apparatus 3 is detected using the detection unit 44 (ST21). Then it is determined whether or not an operation has been detected (ST22), and, in the case where an operation has been detected, when the operation was detected, the electrode connection is switched such that the outer electrode 42 is arranged on the top surface and the human-body-side electrodes 43 are arranged on the sides, as illustrated in FIG. 5B (ST23).

This control allows reliable electric field communication to be realized similarly to the first embodiment even for different states of usage (portable apparatus has been operated or not).
Fourth Embodiment In the present embodiment, description is made of a case in which the portable apparatus 3 is provided with an input function, and when an input is made to the portable apparatus 3 and electric communication is performed at the same time, switching control is performed such that some of the electrodes provided on the sides 37 are made to be the human-body-side electrodes 43, and the rest of the electrodes provided on the sides 37 are made to be the outer electrodes 42. When the display device of the portable apparatus 3 has an input function such as a touch panel, an application may need to perform both an input operation and electric field communication. In such a case, if the outer electrode is only on the top surface 35 of the hexahedron, capacitive coupling generated between the outer electrode and a human body 2 may lower the communication sensitivity. Hence, the outer electrode needs to be provided at a location other than the top surface 35 so as to be unlikely to be coupled with the human body.

Figure 9:
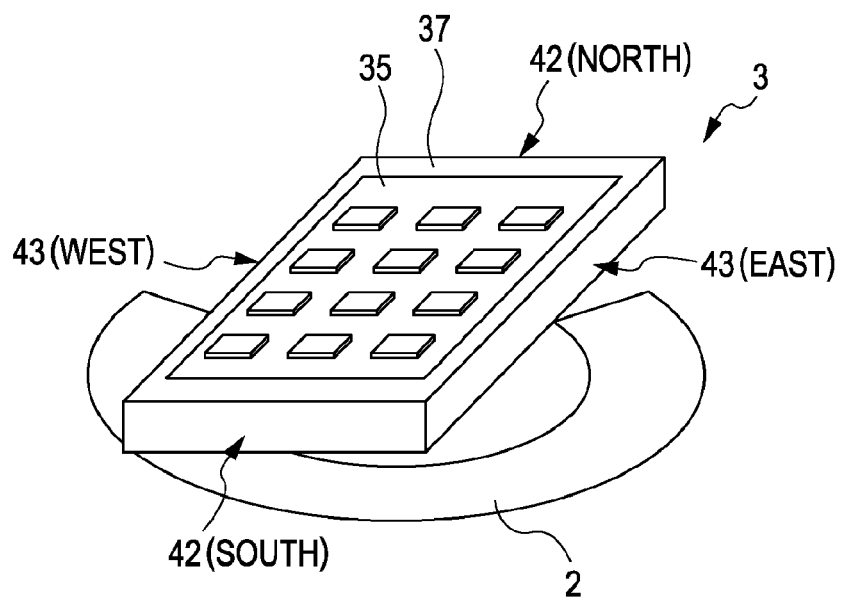
FIG. 9 is an illustration for explaining a portable apparatus according to a fourth embodiment of the present invention.

Specifically, referring to FIG. 9, assuming that the longitudinal direction of the portable apparatus 3 is the north-south direction and that the holding direction in which the portable apparatus is held by a hand 2 is the east-west direction, the outer electrodes 42 are arranged on the north and south sides among the sides 37, and the human-body-side electrodes 43 are arranged on the east and west sides among the sides 37. This allows reliable communication to be realized even when electric field communication is required together with an input operation.

Figure 10:
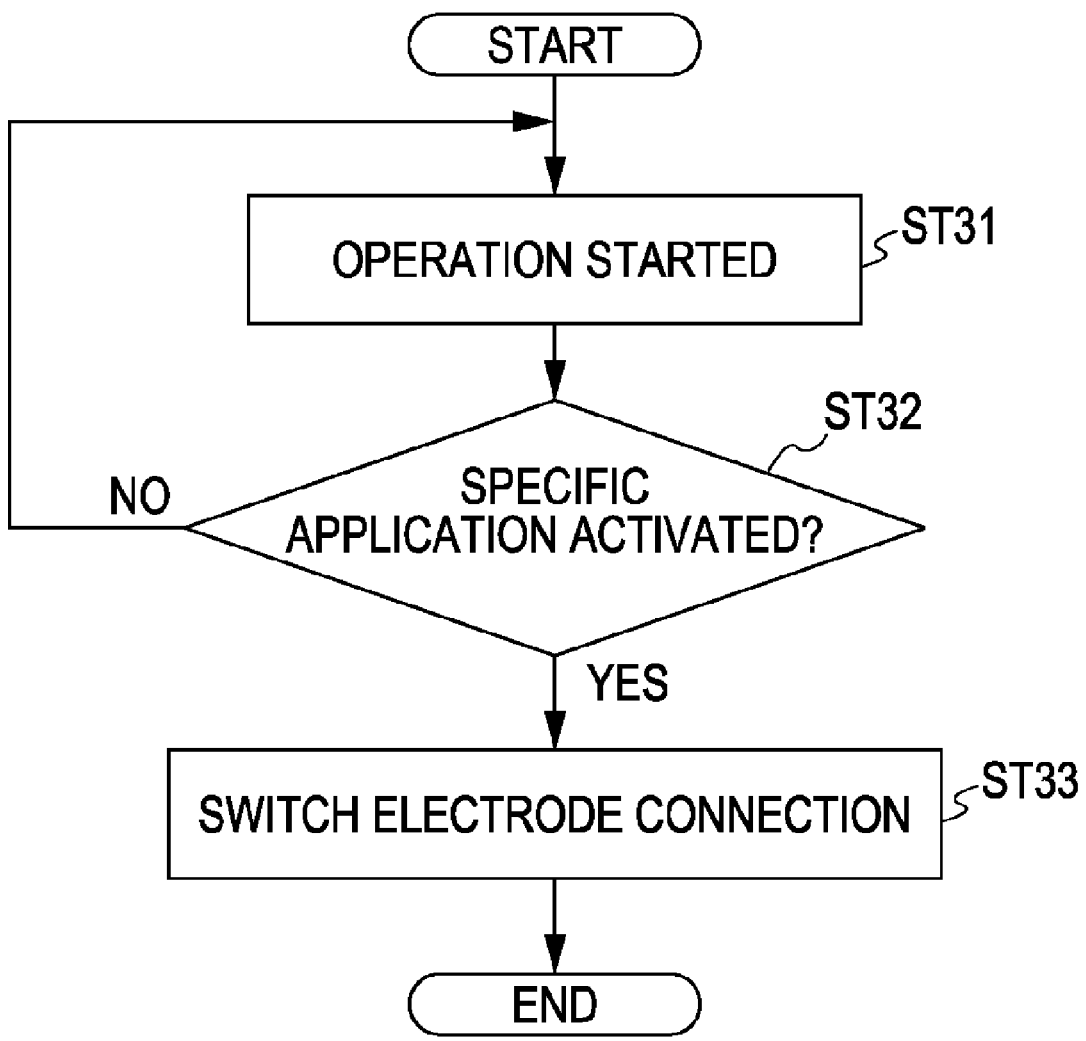
FIG. 10 is a flowchart for explaining the operation of the portable apparatus according to the fourth embodiment.

In the present embodiment, when electric field communication is performed together with an input operation, some of the electrodes provided on the sides 37 are made to be the human-body-side electrodes 43 and the rest of the electrodes provided on the sides 37 are made to be the outer electrodes 42 in accordance with the process illustrated in FIG. 10, when required. First, in a default state, the electrodes are connected such that the outer electrode 42 is arranged on the top surface 35 and the human-body-side electrodes 43 are arranged on the sides 37, as illustrated in FIG. 4A. In this state, an operation is started (ST31), and it is determined whether or not a specific application (application performing electric field communication together with input operations) has been activated (ST32). When the specific application has been started, the electrode connection is switched such that some of the electrodes provided on the sides 37 are made to be the human-body-side electrode 43 and the rest of the electrodes provided on the sides 37 are made to be the outer electrodes 42, as illustrated in FIG. 10 (ST33).

The present invention is not limited to the first to fourth embodiments described above, and other various modifications are possible within the scope of the present invention. For example, the circuit configurations, the number of components, and the numerical values in the first to fourth embodiments are only examples, and not limited to these, and various modifications are possible.

What is claimed is:

1. A portable apparatus for electric field communication in which communication is performed through a transmission medium by converting an information signal into an electric field signal, the apparatus being configured to function as a transmitter for transmitting the electric field signal, as a receiver for receiving the electric field signal, or as a transmitter/receiver for transmitting/receiving the electric field signal, and being substantially hexahedron-shaped and provided with sides and a display surface allowing information to be viewed, wherein the apparatus comprises:
an outer electrode for electric field communication provided on the display surface;
a plurality of first transmission-medium-side electrodes for electric field communication provided on at least one of the sides and on another surface,
and wherein a switching control is performed such that at least one of the first transmission-medium-side electrodes on the sides is not made to be a transmission-medium-side electrode for electric field communication, and the first transmission-medium-side electrode on the another surface is made to be a transmission-medium-side electrode for electric communication.

2. The portable apparatus according to claim 1,
wherein the switching control is further performed such that at least one of the first transmission-medium-side electrodes is made to be the outer electrode for electric field communication.

3. The portable apparatus according to claim 2, wherein an input function is provided to the display surface and if an input is being made to the portable apparatus while the electric field communication is performed, the switching control is further performed such that some of the first transmission-medium-side electrodes are made to be transmission-medium-side electrodes for electric field communication and the rest of the first transmission-medium-side electrodes are made to be outer electrodes for electric field communication.

4. A portable apparatus for electric field communication in which communication is performed through a transmission medium by converting an information signal into an electric field signal, the apparatus being configured to function as a transmitter for transmitting the electric field signal, as a receiver for receiving the electric field signal, or as a transmitter/receiver for transmitting/receiving the electric field signal, and being substantially hexahedron-shaped and provided with sides and a display surface allowing information to be viewed, wherein the apparatus comprises:
an outer electrode for electric field communication provided on the display surface;
a plurality of first transmission-medium-side electrodes provided on at least one of the sides;
a second transmission-medium-side electrode provided on an opposite surface opposite to the display surface,
and wherein a switching control is performed such that either the second transmission-medium-side electrode or at least one of the first transmission-medium-side electrodes is made to be the transmission-medium-side electrode for the electric field communication.

5. The portable apparatus according to claim 4, wherein the switching control is further performed such that the second transmission-medium-side electrode is made to be the transmission-medium-side electrode for electric field communication when the portable apparatus has not been operated for a predetermined period of time, and at least one of the first transmission-medium-side electrodes is made to be the transmission-medium-side electrode for electric field communication when the portable apparatus has been operated.

6. The portable apparatus according to claim 4, further comprising:
a detection unit configured to detect if the portable apparatus is being held,
wherein the switching control is further performed such that the second transmission-medium-side electrode is made to be the transmission-medium-side electrode for electric field communication when it has not been detected that the portable apparatus is being held, and at least one of the first transmission-medium-side electrodes is made to be the transmission-medium-side electrode for electric field communication when it has been detected that the portable apparatus is being held.

7. The portable apparatus according to claim 4,
wherein the switching control is further performed such that at least one of the first transmission-medium-side electrodes is made to be the outer electrode for electric field communication.

8. The portable apparatus according to claim 4, wherein an input function is provided to the display surface and if an input is being made to the portable apparatus while the electric field communication is performed, the switching control is further performed such that some of the first transmission-medium-side electrodes are made to be transmission-medium-side electrodes for electric field communication and the rest of the first transmission-medium-side electrodes are made to be outer electrodes for electric field communication.

9. A portable apparatus for electric field communication in which communication is performed through a transmission medium by converting an information signal into an electric field signal, the apparatus being configured to function as a transmitter for transmitting the electric field signal, as a receiver for receiving the electric field signal, or as a transmitter/receiver for transmitting/receiving the electric field signal, the apparatus having a substantially hexahedron shape having a top surface provided with a display, a bottom surface opposite to the top surface, and side surfaces, wherein the apparatus comprises:
a plurality of electrodes for the electric field communication including:
a top electrode provided on the top surface;
a plurality of side electrodes provided on at least one of the side surfaces; and
a bottom electrode provided on the bottom surface; and
a control unit configured to selectively switch electrode connections based on an operation mode of the apparatus, such that at least one of the electrodes is made to be an outer electrode for the electric field communication, and at least one of the remaining electrodes is made to be a transmission-medium-side electrode for the electric field communication.

10. The portable apparatus according to claim 9, wherein the control unit is configured to set:
the top electrode as an outer electrode for the electric field communication, and the side electrodes as transmission-medium-side electrodes for the electric field communication, if the apparatus is being operated; and
one of the top and bottom electrodes as the outer electrode for the electric field communication, and the other of the top and bottom electrodes as a transmission-medium-side electrode for the electric field communication, if the apparatus has not being operated for a predetermined period of time.

11. The portable apparatus according to claim 9, wherein the control unit is configured to set:
at least one of the side electrodes as the outer electrode for the electric field communication, and at least one of the remaining of the side electrodes as the transmission-medium-side electrodes for the electric field communication, if the display is being used as an input device.

* * * * *